US012741376B2

(12) United States Patent
Kiyosawa

(10) Patent No.: US 12,741,376 B2
(45) Date of Patent: Sep. 22, 2026

(54) CONTROL METHOD, ROBOT SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventor: Yuki Kiyosawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 78 days.

(21) Appl. No.: 18/613,487

(22) Filed: Mar. 22, 2024

(65) Prior Publication Data

US 2024/0316772 A1 Sep. 26, 2024

(30) Foreign Application Priority Data

Mar. 23, 2023 (JP) ................................ 2023-046394

(51) Int. Cl.
*B25J 9/16* (2006.01)

(52) U.S. Cl.
CPC ........... *B25J 9/1664* (2013.01); *B25J 9/1671* (2013.01)

(58) Field of Classification Search
CPC ........ B25J 9/1664; B25J 9/1671; B25J 11/00; G05B 2219/42284; G05B 2219/49137; G05B 2219/49141
See application file for complete search history.

(56) References Cited

U.S. PATENT DOCUMENTS

2018/0043549 A1* 2/2018 Su .......................... B25J 13/081
2018/0297201 A1* 10/2018 Sawada .................. B25J 9/1694
2019/0269476 A1* 9/2019 Bowling ................ A61B 34/20
2021/0053227 A1* 2/2021 Wartenberg .............. B25J 19/06
2021/0078176 A1* 3/2021 Hoshiyama .............. B25J 9/163
2021/0205994 A1* 7/2021 Dai ........................ B25J 9/1674
(Continued)

FOREIGN PATENT DOCUMENTS

JP 2007-283450 A 11/2007

OTHER PUBLICATIONS

May 30, 2015, Safety Control of Robots under Computed Torque Control Using Reachable Sets pp. 331-338.) (Year: 2015) (Year: 2015).*
(Continued)

*Primary Examiner* — Wade Miles
*Assistant Examiner* — Mohammed Yousef Abuelhawa
(74) *Attorney, Agent, or Firm* — Harness, Dickey & Pierce, P.L.C.

(57) ABSTRACT

A robot control method includes detecting a current position of a control point of a robot arm, predicting, using position information indicating the current position, a position to which the control point of the robot arm moves after a current time point, and performing, when an entry restriction region is enabled and there is a possibility that the robot arm enters the entry restriction region based on the predicted position, a control process to avoid entry of the robot arm into the entry restriction region. The control process includes an execution process of a temporary stop which temporarily stops the operation of the robot arm before the robot arm enters the entry restriction region and which does not require a return operation when resuming the operation after the stop.

8 Claims, 8 Drawing Sheets

(56) References Cited

U.S. PATENT DOCUMENTS

2021/0205995 A1* 7/2021 Vu ........................ B25J 9/1666
2022/0315353 A1* 10/2022 Sun ........................ B25J 9/1676

OTHER PUBLICATIONS

Aaron Pereira et al., "Safety Control of Robots Under Computed Torque Control Using Reachable Sets", 2015 IEEE International Conference on Robotics and Automation (ICRA), May 26, 2015, Washington State Convention Center, Seattle, WA, pp. 331-338.

* cited by examiner

100
ROBOT
133
131
132
130
ANGLE SENSOR
MOTOR
SPEED REDUCER
DRIVING MECHANISM
700
ROBOT CONTROLLER
730
CONTROL UNIT
731
MEMORY
732
CPU
710
DRIVING UNIT
720
POWER SUPPLY CIRCUIT UNIT
740
POWER CUT-OFF UNIT
750
751
752
FUNCTIONAL SAFETY UNIT
MEMORY
CPU
SC
300
SAFETY INPUT UNIT
SS
400
FIRST STOP SIGNAL GENERATION UNIT
S1
500
SECOND STOP SIGNAL GENERATION UNIT
S2

START
S101
RESTRICTION REGION ENABLED?
NO
YES
S104
PREDICT POSITION TO BE MOVED
S106
IS THERE POSSIBILITY OF ENTERING RESTRICTION REGION?
NO
YES
S107
TEMPORARY STOP
S109
YES
RESTRICTION REGION ENABLED?
NO
S111
RESUME OPERATION
S113
YES
CONTINUE PROCESSING?
NO
END

FIG. 10

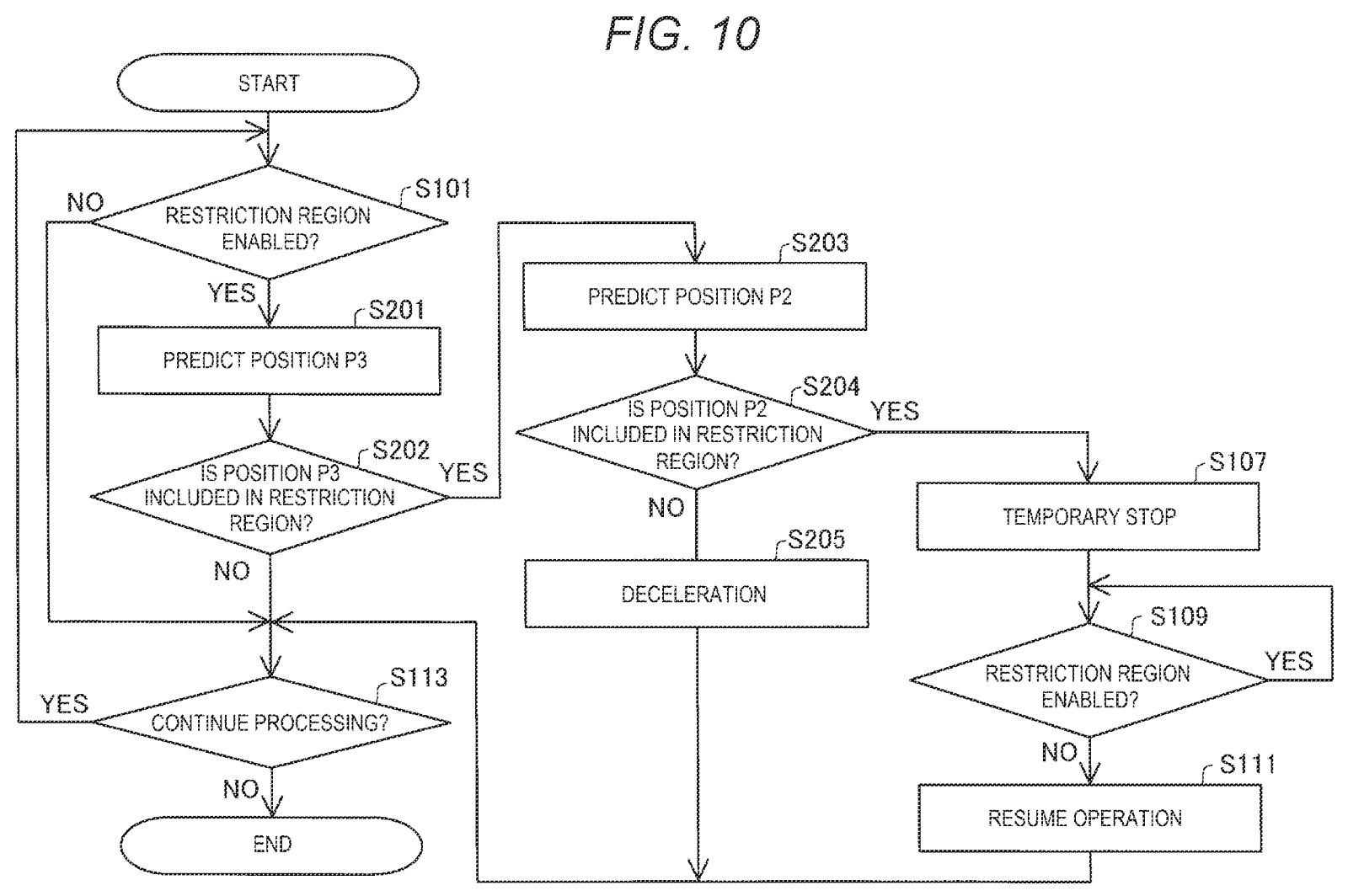

START

S101 RESTRICTION REGION ENABLED?

YES

NO

S201 PREDICT POSITION P3

S202 IS POSITION P3 INCLUDED IN RESTRICTION REGION?

YES

NO

S203 PREDICT POSITION P2

S204 IS POSITION P2 INCLUDED IN RESTRICTION REGION?

YES

NO

S205 DECELERATION

S107 TEMPORARY STOP

S109 RESTRICTION REGION ENABLED?

YES

NO

S111 RESUME OPERATION

S113 CONTINUE PROCESSING?

YES

NO

END

CONTROL METHOD, ROBOT SYSTEM, AND NON-TRANSITORY COMPUTER-READABLE STORAGE MEDIUM STORING PROGRAM

The present application is based on, and claims priority from JP Application Serial Number 2023-046394, filed Mar. 23, 2023, the disclosure of which is hereby incorporated by reference herein in its entirety.

BACKGROUND

1. Technical Field

The present disclosure relates to a control method, a robot system, and a non-transitory computer-readable storage medium storing a program.

2. Related Art

JP-A-2007-283450 discloses a technique for forcibly stopping an operation of a robot when a sensor detects that a worker enters a movable region of the robot.

JP-A-2007-283450 is an example of the related art.

When the operation of the robot is forcibly stopped, for example, a user needs to perform a return operation to resume the operation of the robot. The operation of the robot cannot be resumed until the return operation is completed. When the operation of the robot is forcibly stopped frequently, a time during which the work of the robot is stopped increases and work efficiency decreases. Therefore, there is a demand for a technique capable of reducing the time during which the work of the robot is forcibly interrupted.

SUMMARY

A first aspect of the present disclosure provides a control method for controlling a robot arm in a robot system. The robot system includes the robot arm, a control unit configured to control an operation of the robot arm, and a functional safety unit configured to execute, when an entry restriction region is enabled and the robot arm enters the entry restriction region, a forced stop which is a forced stop of the operation of the robot arm and which requires a return operation when resuming the operation after the stop, and not to execute, when the entry restriction region is disabled and the robot arm enters the entry restriction region, the forced stop of the operation of the robot arm. The control method for controlling the robot arm by the control unit includes: detecting a current position of a control point of the robot arm; predicting, using at least position information indicating the current position, at least one position to which the control point of the robot arm moves after a current time point; and performing, when the entry restriction region is enabled and there is a possibility that the robot arm enters the entry restriction region based on the at least one predicted position, control to avoid entry of the robot arm into the entry restriction region, the control including execution of a temporary stop which is a temporary stop of the operation of the robot arm before the robot arm enters the entry restriction region and which does not require the return operation when resuming the operation after the stop.

According to a second aspect of the present disclosure, a robot system is provided. The robot system includes: a robot arm; a control unit configured to control an operation of the robot arm; and a functional safety unit configured to execute, when an entry restriction region is enabled and the robot arm enters the entry restriction region, a forced stop which is a forced stop of the operation of the robot arm and which requires a return operation when resuming the operation after the stop, and not to execute, when the entry restriction region is disabled and the robot arm enters the entry restriction region, the forced stop of the operation of the robot arm. The control unit is configured to detect a current position of a control point of the robot arm, predict, using at least information indicating the current position, at least one position to which the control point of the robot arm moves after a current time point, and perform, when the entry restriction region is enabled and there is a possibility that the robot arm enters the entry restriction region based on the at least one predicted position, control to avoid entry of the robot arm into the entry restriction region, the control including execution of a temporary stop which is a temporary stop of the operation of the robot arm before the robot arm enters the entry restriction region and which does not require the return operation when resuming the operation after the stop.

According to a third aspect of the present disclosure, a non-transitory computer-readable storage medium storing a program is provided. The program is executed by a computer that controls a robot arm in a robot system. The robot system includes the robot arm, a control unit configured to control an operation of the robot arm, and a functional safety unit configured to execute, when an entry restriction region is enabled and the robot arm enters the entry restriction region, a forced stop which is a forced stop of the operation of the robot arm and which requires a return operation when resuming the operation after the stop, and not to execute, when the entry restriction region is disabled and the robot arm enters the entry restriction region, the forced stop of the operation of the robot arm. The program causes the computer to implement: a function of detecting a current position of a control point of the robot arm; a function of predicting, using at least information indicating the current position, at least one position to which the control point of the robot arm moves after a current time point; and a function of performing, when the entry restriction region is enabled and there is a possibility that the robot arm enters the entry restriction region based on the at least one predicted position, control to avoid entry of the robot arm into the entry restriction region, the control including execution of a temporary stop which is a temporary stop of the operation of the robot arm before the robot arm enters the entry restriction region and which does not require the return operation when resuming the operation after the stop.

BRIEF DESCRIPTION OF THE DRAWINGS

FIG. 10 is a flowchart of processing related to position control in another Embodiment 2.

DESCRIPTION OF EMBODIMENTS

A. First Embodiment

Figure 1:
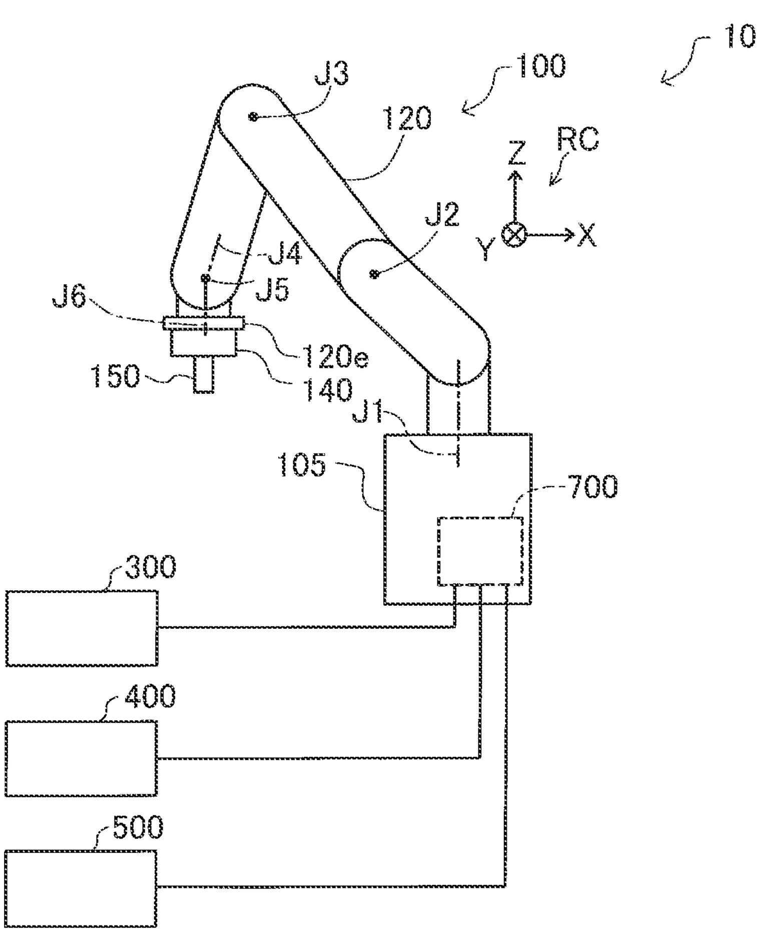
FIG. 1 is a schematic diagram showing an overall configuration of a robot system according to a first embodiment.
Figure 2:
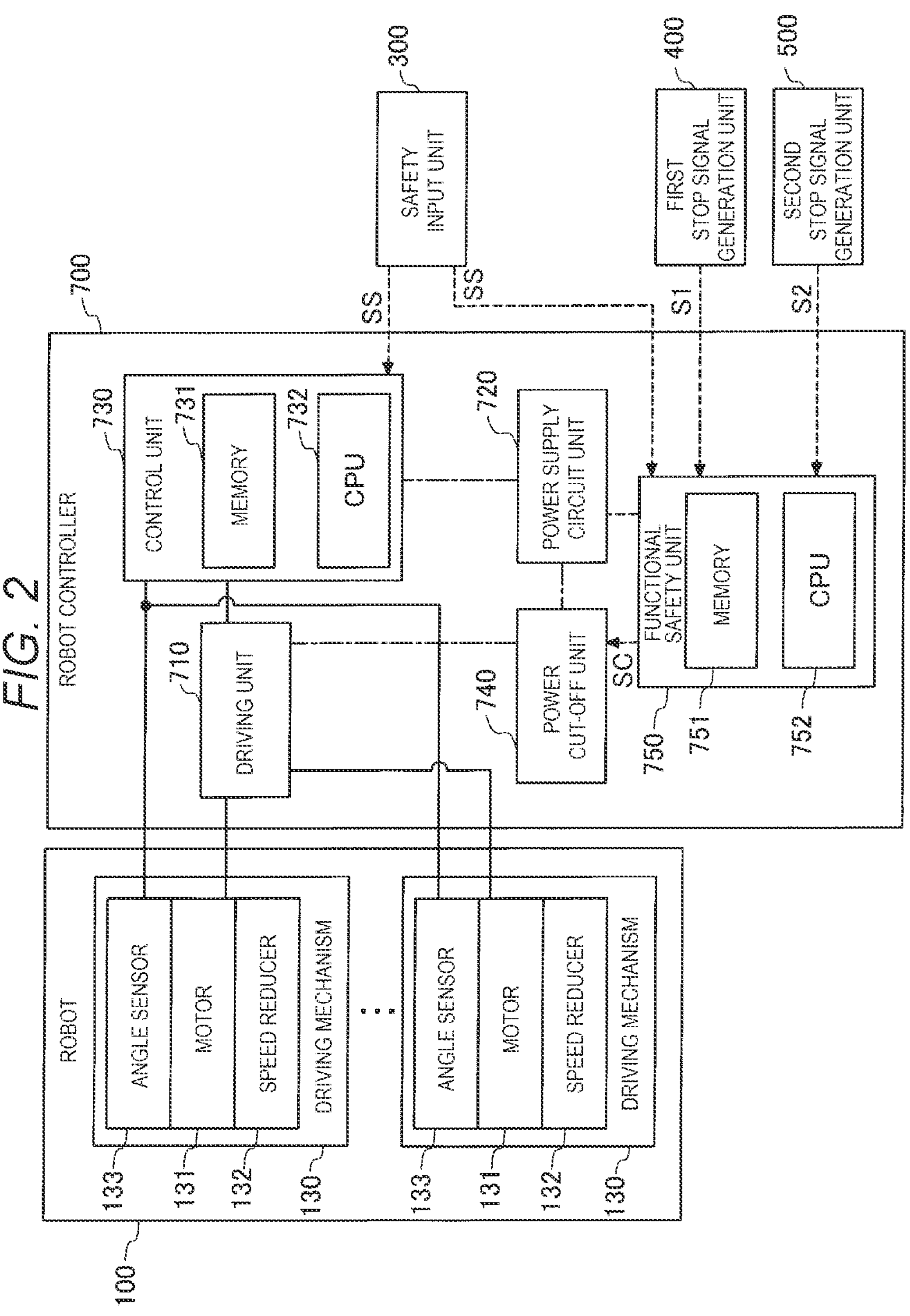
FIG. 2 is a block diagram showing main parts of a robot and a robot controller.

FIG. 1 is a schematic diagram showing an overall configuration of a robot system 10 according to the embodiment. FIG. 2 is a block diagram showing main parts of a robot 100 and a robot controller 700. As shown in FIG. 1, the robot system 10 includes the robot 100, a safety input unit 300, a first stop signal generation unit 400, a second stop signal generation unit 500, and the robot controller 700.

The robot 100 is a vertically articulated robot. The robot 100 is driven by the robot controller 700 and performs, for example, an assembly work which is a part of a manufacturing process in a production line. The robot 100 is also referred to as a robot arm. The robot 100 includes a base 105, an arm 120, six driving mechanisms 130, a force sensor 140, and an end effector 150. The driving mechanism 130 is not shown in FIG. 1. The base 105 supports members constituting the robot 100. The arm 120 includes six joints J1 to J6. Each of the joints J1 to J6 is provided with a corresponding driving mechanism 130.

As shown in FIG. 2, the driving mechanism 130 includes a motor 131, a speed reducer 132, and an angle sensor 133. The motor 131 is supplied with a current from the robot controller 700 and generates a rotation output for driving the corresponding joint. The speed reducer 132 converts a rotation input given from the motor 131 into a rotation output having a low rotation speed, that is, decelerates the rotation input. The angle sensor 133 detects a rotation angle (shaft position) of an output shaft of the motor 131 as a rotation angle of the joint. The angle sensor 133 detects the rotation angle at a determined time interval, and outputs the detected rotation angle together with a detection time point to the robot controller 700. The determined time interval is, for example, 100 milliseconds. The angle sensor 133 is, for example, an encoder, a potentiometer, or a resolver. The driving mechanism 130 drives the corresponding joint according to the control of the robot controller 700, so that the end effector 150 is disposed at a position designated in a robot coordinate system RC in a designated posture.

As shown in FIG. 1, the robot coordinate system RC is a coordinate system that is fixed to a position of the base 105 and defines a space in which the robot 100 is installed. The robot coordinate system RC is a three-dimensional orthogonal coordinate system defined by an X axis and a Y axis orthogonal to each other on a horizontal plane and a Z axis having a vertically upward direction as a positive direction. Any position in the robot coordinate system RC can be represented by a position in an X-axis direction, a position in a Y-axis direction, and a position in a Z-axis direction. Any posture in the robot coordinate system RC can be represented by an angular position of rotation about the X axis, an angular position of rotation about the Y axis, and an angular position of rotation about the Z axis.

The force sensor 140 is attached to an arm end 120*e*. In a sensor coordinate system different from the robot coordinate system RC, the force sensor 140 detects magnitudes of forces acting on the end effector 150 parallel to detection axes of the X axis, the Y axis, and the Z axis, and magnitudes of torques around the respective detection axes. The force sensor 140 outputs a detection value to the robot controller 700. The sensor coordinate system is a three-dimensional orthogonal coordinate system having a point on the force sensor 140 as an origin.

The end effector 150 is attached to the arm end 120*e* via the force sensor 140. The end effector 150 is a device for gripping a workpiece (not shown). In FIG. 1, in order to facilitate understanding of the technique, the end effector 150 is shown as a tubular member.

The safety input unit 300 shown in FIG. 2 generates a safety input signal SS when a person is present in a restriction region RA set in advance around the robot 100. The safety input unit 300 includes a light curtain, a laser scanner, a mat switch, a door switch of a safety door, and the like for detecting the presence of a person in the restriction region RA. The safety input unit 300 is also referred to as a safety input device.

Figure 3:
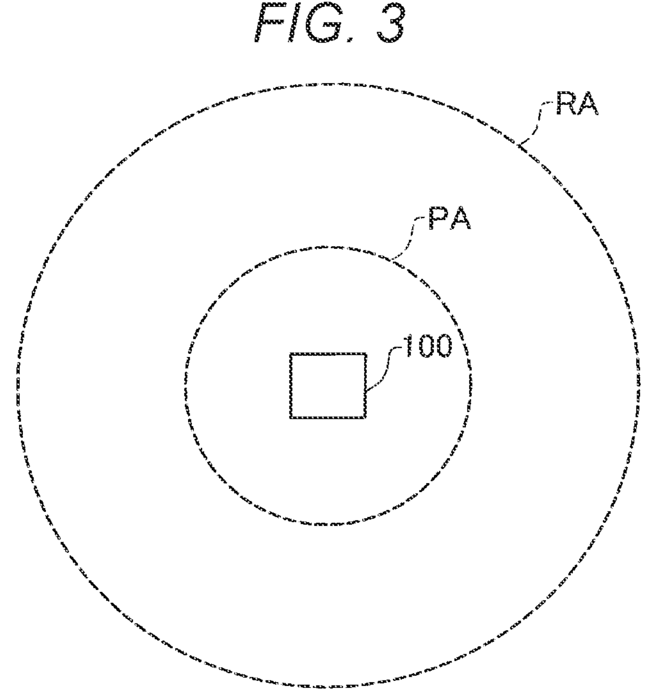
FIG. 3 is a diagram of a restriction region and a protection region.

FIG. 3 is a diagram of the restriction region RA set around the robot 100. The restriction region RA is also referred to as an entry restriction region. In FIG. 3, the robot 100 is represented by a square. In the example shown in FIG. 3, the restriction region RA is set outside a protection region PA, which is described later, around the robot 100. The restriction region RA is a region in which a worker performs a work as necessary. For example, the worker enters the restriction region RA and carries a pallet containing a workpiece to be worked on by the robot 100 to a determined position. When performing a new work, the robot 100 takes out a new workpiece from the pallet placed within the restriction region RA. As the restriction region RA, a region in which a region in which a worker performs a work and a range in which the robot 100 can operate overlap is set. In order to ensure safety, while it is detected that a person is present in the restriction region RA, a functional safety unit 750 to be described later restricts the robot 100 from entering the restriction region RA.

For example, the light curtain of the safety input unit 300 is installed at a boundary of the restriction region RA. While the presence of a person in the restriction region RA is detected by the light curtain, the safety input unit 300 continues to output the safety input signal SS to the robot controller 700. For example, the robot 100 is surrounded by a safety fence having a safety door. While an open state of the door switch is detected, the safety input unit 300 continues to output the safety input signal SS to the robot controller 700. The safety input signal SS is a signal for switching between enabling and disabling the restriction region RA.

The first stop signal generation unit 400 includes an emergency stop button provided in a production facility and an emergency stop button provided in a teaching pendant. When the worker instructs to stop the robot 100 by pressing the emergency stop button provided in the production facility or the emergency stop button provided in the teaching pendant, the first stop signal generation unit 400 generates a first stop signal S1. The first stop signal S1 is a signal for notifying an instruction to perform an emergency stop of the robot 100.

The second stop signal generation unit 500 generates a second stop signal S2 when detecting that a person is present in the protection region PA set in advance around the robot 100. The second stop signal generation unit 500 includes a light curtain, a laser scanner, a mat switch, a door switch of a safety door, and the like for detecting the presence of a person in the protection region PA.

As shown in FIG. 3, the protection region PA is set inside the restriction region RA around the robot 100. The protection region PA is a region overlapping a range in which the robot 100 can operate. When it is detected that a person is present in the protection region PA, the functional safety unit 750 to be described later completely stops an operation of the robot 100.

While the presence of a person in the protection region PA is detected, the second stop signal generation unit 500 continues to output the second stop signal S2 to the robot controller 700. The second stop signal S2 is a signal for notifying an instruction to perform a protection stop on the robot 100.

The robot controller 700 includes a driving unit 710, a power supply circuit unit 720, a control unit 730, a power cut-off unit 740, and the functional safety unit 750.

The driving unit 710 includes six motor drivers corresponding to the joints J1 to J6, respectively. The driving unit 710 drives the six motor drivers corresponding to the joints J1 to J6 under the control of the control unit 730. Each motor driver drives the motor 131 that rotates the corresponding joint. The driving unit 710 is disposed inside the arm 120.

The power supply circuit unit 720 converts power supplied from an external AC power supply (not shown) into DC power, and supplies the converted power to the driving unit 710, the control unit 730, and the functional safety unit 750. The power is supplied to the driving unit 710 via the power cut-off unit 740 to be described later. The power supply circuit unit 720, the control unit 730, the power cut-off unit 740, and the functional safety unit 750 are disposed inside the base 105.

The control unit 730 drives the robot 100 by controlling the driving unit 710. The control unit 730 is a computer including a memory 731 and a central processing unit (CPU) 732. Unlike the functional safety unit 750 to be described later, the control unit 730 does not need to be configured to satisfy a standard related to functional safety. The memory 731 stores programs and data used for various kinds of processing executed by the control unit 730. The memory 731 is also referred to as a storage unit. For example, the memory 731 stores an operation program for controlling the operation of the robot 100. The memory 731 also stores data representing the rotation angle and the detection time point output by the angle sensor 133. The CPU 732 implements various functions by executing the programs stored in the memory 731.

The control unit 730 controls, via the driving unit 710, a position of a control point of the robot 100 by changing a position and a posture of the robot 100. As a result, the end effector 150 is arranged at a target point, which is a position designated in a three-dimensional space, in a designated posture. The control point is a point serving as a reference for controlling the robot 100 in the robot coordinate system RC. For example, a tool center point (TCP), which is a center of a point at which the end effector 150 comes into contact with an object, can be set as the control point. For example, the control unit 730 controls the arm 120 and the end effector 150 according to an operation command received from a programmable logic controller (not shown).

When the control unit 730 receives the safety input signal SS that enables the restriction region RA, the control unit 730 controls the position of the control point of the robot 100. While the safety input signal SS is input, the control unit 730 limits the position of the control point of the robot 100. Details of the control will be described later.

The power cut-off unit 740 cuts off a supply of power to the driving unit 710 under the control of the functional safety unit 750. The power cut-off unit 740 includes a relay circuit. Upon receiving a cut-off signal SC from the functional safety unit 750, the power cut-off unit 740 opens the relay circuit. Therefore, the supply of power from the power supply circuit unit 720 to the driving unit 710 is cut off. The power cut-off unit 740 closes the relay circuit until the cut-off signal SC is received from the functional safety unit 750. In this case, the power is supplied from the power supply circuit unit 720 to the driving unit 710.

The functional safety unit 750 monitors the robot 100 and performs control necessary for ensuring functional safety. The functional safety is safety at an allowable level implemented by introducing a function of ensuring safety. The functional safety unit 750 is a computer including a memory 751 and a CPU 752. The functional safety unit 750 is implemented to satisfy a standard related to the functional safety. Regarding the standard related to the functional safety, for example, ISO 10218-1:2011, which is a safety standard for robots, refers to ISO 13849-1:2015 as a requirement for the functional safety. The memory 751 stores programs and data used for various kinds of processing executed by the functional safety unit 750. The CPU 752 implements various functions by executing the programs stored in the memory 751.

The functional safety unit 750 monitors whether the first stop signal S1 is input from the first stop signal generation unit 400. When the first stop signal S1 is input, the functional safety unit 750 executes an emergency stop corresponding to "safe torque off (STO)" defined in IEC 60204-1:2016. Specifically, the functional safety unit 750 outputs the cut-off signal SC to the power cut-off unit 740 to cut off the supply of power to the motor 131 of the robot 100. Therefore, the operation of the robot 100 is forcibly stopped. Alternatively, when the first stop signal S1 is input, the functional safety unit 750 executes a protection stop corresponding to "safe stop 1 (SS1)" defined in IEC 60204-1:2016. Specifically, the functional safety unit 750 stops the operation of the robot 100 via the control unit 730. Thereafter, the functional safety unit 750 outputs the cut-off signal SC to the power cut-off unit 740 to cut off the supply of power to the motor 131 of the robot 100. Therefore, the operation of the robot 100 is forcibly stopped. For example, when the emergency stop corresponding to "STO" is executed, in order to resume the operation of the robot 100, it is necessary for the worker to perform a determined return operation, including manually resetting the emergency stop button.

The functional safety unit 750 monitors whether the second stop signal S2 is input from the second stop signal generation unit 500. When the second stop signal S2 is input, the functional safety unit 750 performs the emergency stop or the protection stop corresponding to "STO" or "SS1".

The functional safety unit 750 monitors whether the safety input signal SS is input from the safety input unit 300. The functional safety unit 750 enables a position monitoring function when the safety input signal SS is input. While the safety input signal SS is input, the position monitoring function of monitoring the position of the control point of the robot 100 is enabled in the functional safety unit 750. When the position monitoring function is enabled, the functional safety unit 750 controls the robot 100 as follows.

The functional safety unit 750 calculates the position of the control point of the robot 100 using a detection value of the angle sensor 133, and monitors whether the position of the control point of the robot 100 is within the restriction region RA. In FIG. 2, illustration of signal lines coupling the functional safety unit 750 and the angle sensor 133 is omitted. Position information of the restriction region RA is stored in the memory 751 in advance.

Figure 4:
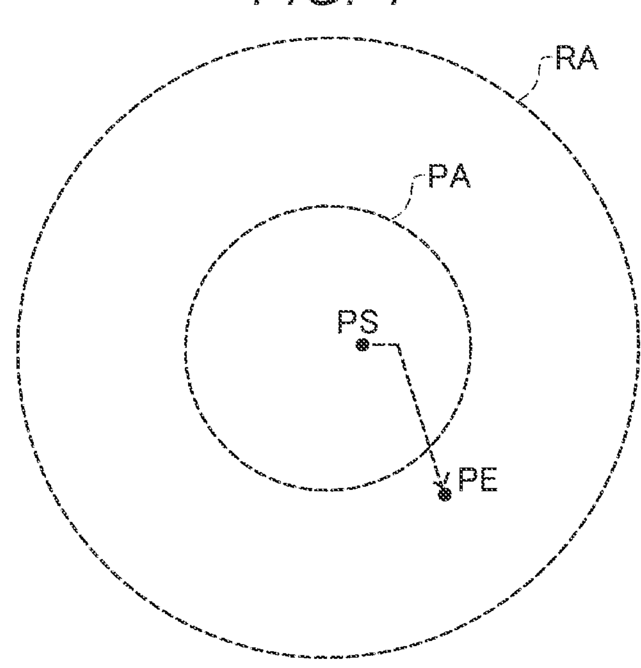
FIG. 4 is a diagram showing an example of a movement history of a control point of the robot.

FIG. 4 is a diagram showing an example of a movement history of the control point when the robot 100 is viewed from above. The movement history of the control point is represented by a broken line. The restriction region RA is enabled. The control point of the robot 100 starts moving from a position PS. When it is detected that the control point enters the restriction region RA, the functional safety unit 750 brings the robot 100 to the protection stop. In the shown example, the movement of the control point is stopped at a position PE.

When the safety input signal SS is input and the position of the control point of the robot 100 is within the restriction region RA, the functional safety unit 750 shown in FIG. 2 performs the protection stop corresponding to "SS1". The execution of the protection stop corresponding to "SS1" by the functional safety unit 750 is as described above. Therefore, the operation of the robot 100 is forcibly stopped. Alternatively, when the safety input signal SS is input and the position of the control point of the robot 100 is within the restriction region RA, the functional safety unit 750 may execute the emergency stop corresponding to "STO". The execution of the emergency stop corresponding to "STO" by the functional safety unit 750 is as described above. In this specification, a forced stop of the operation of the robot 100 that requires a return operation when resuming the operation after the stop is referred to as a forced stop.

Figure 5:
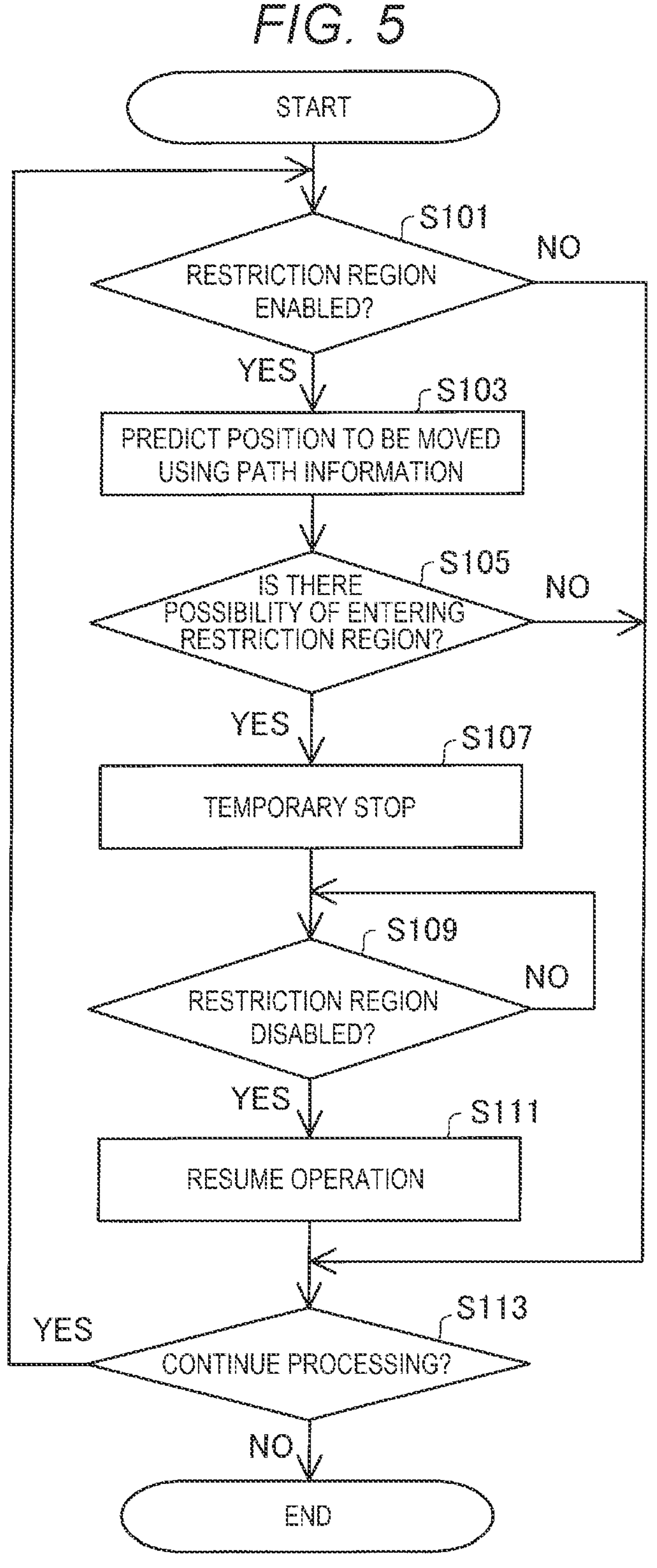
FIG. 5 is a flowchart of processing related to position control.

FIG. 5 is a flowchart of processing related to position control. The processing shown in FIG. 5 is executed by the CPU 732 of the control unit 730. For example, when a user gives an instruction to start the processing via an input device (not shown), the control unit 730 starts the processing shown in FIG. 5. In parallel with the execution of the processing shown in FIG. 5, the control unit 730 controls the operation of the robot 100 so that the control point of the robot 100 moves along a scheduled movement path.

In step S101, the control unit 730 determines whether the restriction region RA is enabled according to whether the safety input signal SS is input from the safety input unit 300. In the embodiment, the control unit 730 can easily grasp whether the restriction region RA is enabled based on the safety input signal SS. When the safety input signal SS is input and the restriction region RA is enabled (step S101; YES), the control unit 730 executes processing of step S103. The safety input signal SS is input to both the control unit 730 and the functional safety unit 750. Therefore, when the safety input signal SS is input, the position monitoring function of the functional safety unit 750 is enabled. When the safety input signal SS is not input and the restriction region RA is disabled (step S101; NO), the control unit 730 executes processing of step S113. When the restriction region RA is disabled, the operation of the robot 100 is not restricted.

In step S103, the control unit 730 predicts a position to which the control point of the robot 100 moves after a current time point. First, the control unit 730 reads, from the memory 731, path information indicating the scheduled movement path for the control point of the robot 100. The path information indicating the scheduled movement path is stored in the memory 731 in advance. The path information indicating the scheduled movement path includes information indicating positions of a start point, one or more relay points, and an end point. The control unit 730 calculates a current position of the control point of the robot 100 by calculation based on forward kinematics using rotation angles detected by the six angle sensors 133 and lengths of links constituting the arm 120. The control unit 730 determines where the calculated current position is located on the movement path using the calculated current position and the path information.

For example, the scheduled movement path includes a start point P11, relay points P12 to P14, and an end point P15. The control point is scheduled to move in the order of the start point P11, the relay point P12, the relay point P13, the relay point P14, and the end point P15. When it is determined that the current position is located between the relay point P12 and the relay point P13, the control unit 730 determines that the positions to be moved after the current time point are the relay points P13 and P14 and the end point P15 after the relay point P12. The control unit 730 predicts that the path including the relay points P13 and P14 and the end point P15 is the path along which the control point moves after the current time point.

In step S105, the control unit 730 determines whether there is a possibility that the robot 100 enters the restriction region RA according to whether at least a part of the path including the predicted positions is included in the restriction region RA. When the control unit 730 determines that the robot 100 is likely to enter the restriction region RA (step S105; YES), the control unit 730 executes processing of step S107. On the other hand, when it is determined that there is no possibility that the robot 100 enters the restriction region RA (step S105; NO), the control unit 730 executes processing of step S113.

In step S107, the control unit 730 controls the driving unit 710 to temporarily stop the robot 100. Therefore, the operation of the robot 100 is stopped, and entry of the robot 100 into the restriction region RA is avoided. At this time, the power supply to the driving unit 710 is not cut off by the power cut-off unit 740. Therefore, when the operation of the stopped robot 100 is resumed, the return operation is not necessary.

In step S109, the control unit 730 determines whether the restriction region RA is disabled based on presence or absence of the input of the safety input signal SS. When the safety input signal SS is not input and the restriction region RA is disabled (step S109; YES), the control unit 730 executes processing of step S111. When the operation of the robot 100 is temporarily stopped to avoid entry into the restriction region RA, the input of the safety input signal SS from the safety input unit 300 is stopped means that the restriction region RA is disabled. When the safety input signal SS is input and the restriction region RA is enabled (step S109; NO), the control unit 730 waits for a certain period of time and then executes the processing of step S109 again.

In step S111, the control unit 730 controls the driving unit 710 to resume the operation of the robot 100. Therefore, the operation of the robot 100 is resumed.

In step S113, the control unit 730 determines whether to continue the processing. For example, when the user gives an instruction to end the processing via an input device (not shown), the control unit 730 determines that the processing is to end. When the end of the processing is not instructed, that is, when the processing is continued (step S113; YES), the control unit 730 executes the processing of step S101 again. When the processing ends (step S113; NO), the processing shown in FIG. 5 ends.

Here, in step S109, a configuration is described in which, when the safety input signal SS is input and the restriction region RA is enabled (step S109; NO), the control unit 730 waits for a certain period of time and then executes the processing of step S109 again, and the present disclosure is not limited thereto. For example, when the user gives an instruction to end the processing via an input device (not shown) while the restriction region RA is enabled after the processing proceeds to step S109, the control unit 730 may determine to end the processing and end the processing shown in FIG. 5.

As described above, in the embodiment, the control unit 730 predicts the possibility that the control point of the robot 100 enters the restriction region RA. When there is a possibility that the robot 100 enters the restriction region RA, the control unit 730 performs control to avoid the robot 100 from entering the restriction region RA. Therefore, the functional safety unit 750 does not need to forcibly stop the operation of the robot 100. In this case, the return operation when resuming the operation after the forced stop is unnecessary. Therefore, it is possible to shorten a time during which the work of the robot 100 is forcibly interrupted.

When control to avoid the entry of the robot arm into the restriction region RA by temporarily stopping the operation of the robot 100 is performed, and the operation of the robot 100 is temporarily stopped, and when the restriction region RA is disabled, the operation of the robot 100 can be quickly resumed without requiring the return operation. Therefore, it is possible to shorten the time for which the work of the robot 100 is interrupted as compared with a mode in which the control unit 730 does not avoid entry into the restriction region RA.

In addition, the control unit 730 can reliably predict whether there is a possibility that the robot arm enters the restriction region RA by predicting at least one position to which the robot 100 moves after the current time point using the information indicating the current position and the path information indicating the scheduled movement path. The control unit 730 can predict at least one position to which the robot 100 moves after the current time point.

B. Second Embodiment

In the first embodiment, the robot 100 operates along the scheduled movement path. Therefore, the control unit 730 predicts a possibility that the robot 100 enters the restriction region RA using the path information indicating the scheduled movement path. In a second embodiment, the control unit 730 predicts the possibility that the robot 100 enters the restriction region RA by a method different from that of the first embodiment. Hereinafter, configurations different from those of the first embodiment will be mainly described. Description of the configurations same as the configurations according to the first embodiment will be omitted.

Figure 6:
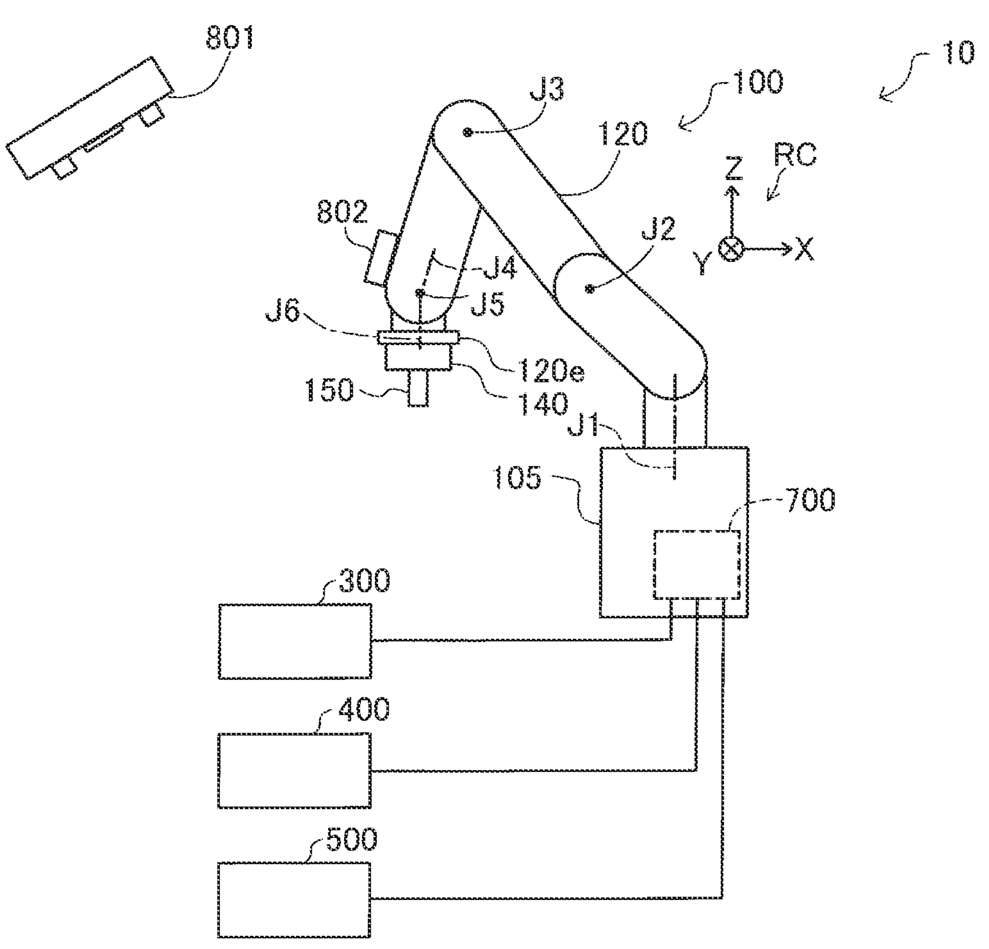
FIG. 6 is a schematic diagram showing an overall configuration of a robot system according to a second embodiment.

FIG. 6 is a schematic diagram showing an overall configuration of the robot system 10 according to the second embodiment. The robot system 10 according to the second embodiment further includes sensors 801 and 802 in addition to the configuration described in the first embodiment.

The sensor 801 is a three-dimensional vision sensor. The sensor 801 is installed at a position capable of imaging a workpiece (not shown). The robot controller 700 and the sensor 801 can communicate with each other. The sensor 801 images the workpiece while projecting pattern light. Further, the sensor 801 images the workpiece without projecting the pattern light. The imaging is performed in a determined imaging cycle. The captured image is used when the robot controller 700 calculates a position and a posture of the workpiece in a three-dimensional space. The sensor 802 is, for example, a laser displacement sensor. The sensor 802 is fixed to a tip end of the arm 120 of the robot 100. The sensor 802 detects an object around the arm 120. The robot controller 700 and the sensor 802 can communicate with each other.

In the embodiment, the control unit 730 operates the robot 100 along a dynamically generated path by feedback control using CAD data including information such as a position, a size, and a shape of an object present in a space in which the robot 100 works and detection values detected by the sensors 801 and 802.

Figure 7:
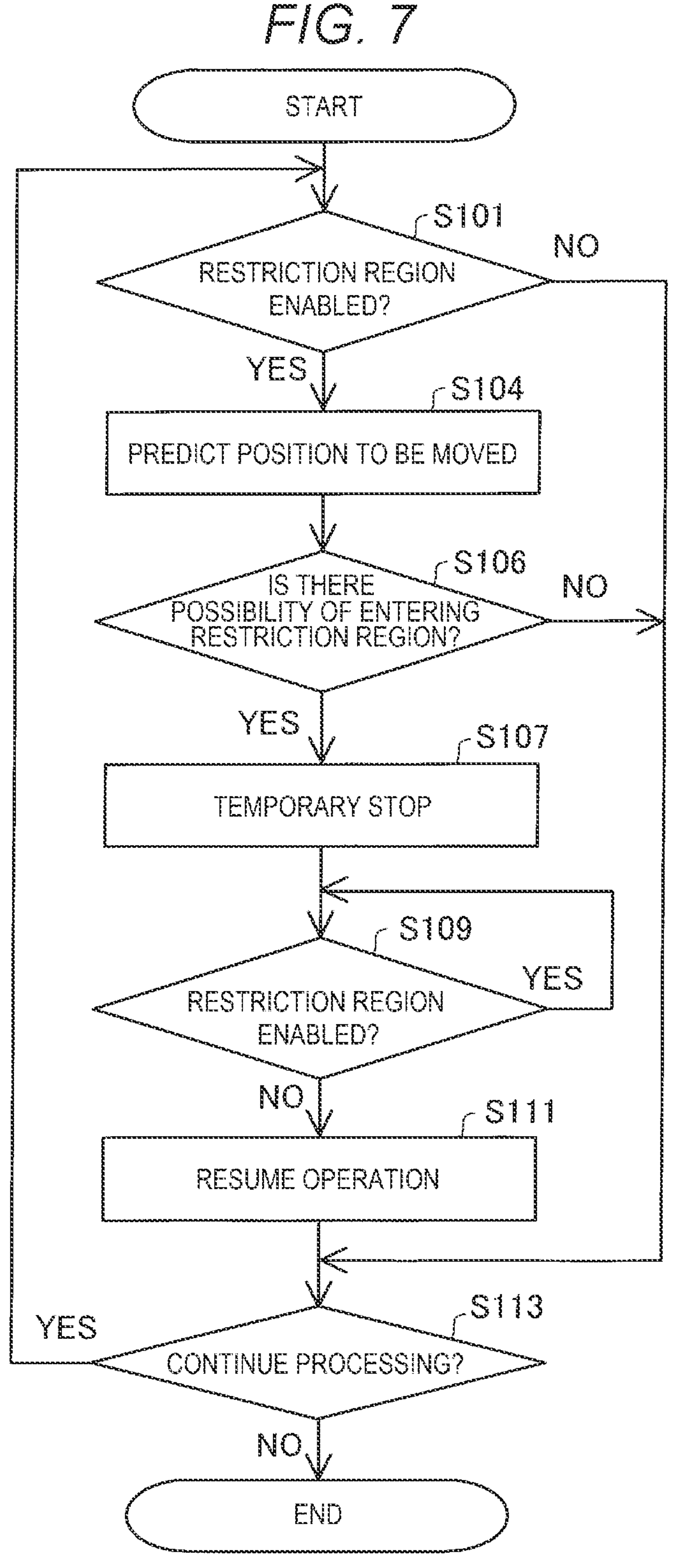
FIG. 7 is a flowchart of processing related to position control in the second embodiment.

FIG. 7 is a flowchart of processing related to position control in the second embodiment. The processing shown in FIG. 7 is executed by the CPU 732 of the control unit 730. For example, when a user gives an instruction to start the processing via an input device (not shown), the control unit 730 starts the processing shown in FIG. 7. In FIG. 7, the processing same as the processing related to the position control in the first embodiment (see FIG. 5) is denoted by the same reference numeral. In parallel with the execution of the processing shown in FIG. 7, the control unit 730 controls the operation of the robot 100 so that the control point of the robot 100 moves along the dynamically generated path.

In step S101, the processing same as in step S101 shown in FIG. 5 is performed. When the restriction region RA is enabled (step S101; YES), the control unit 730 executes processing of step S104. When the restriction region RA is disabled (step S101; NO), the control unit 730 executes the processing of step S113.

As shown in FIG. 7, in step S104, the control unit 730 predicts a position to which the control point moves after a current time point.

Figure 8:
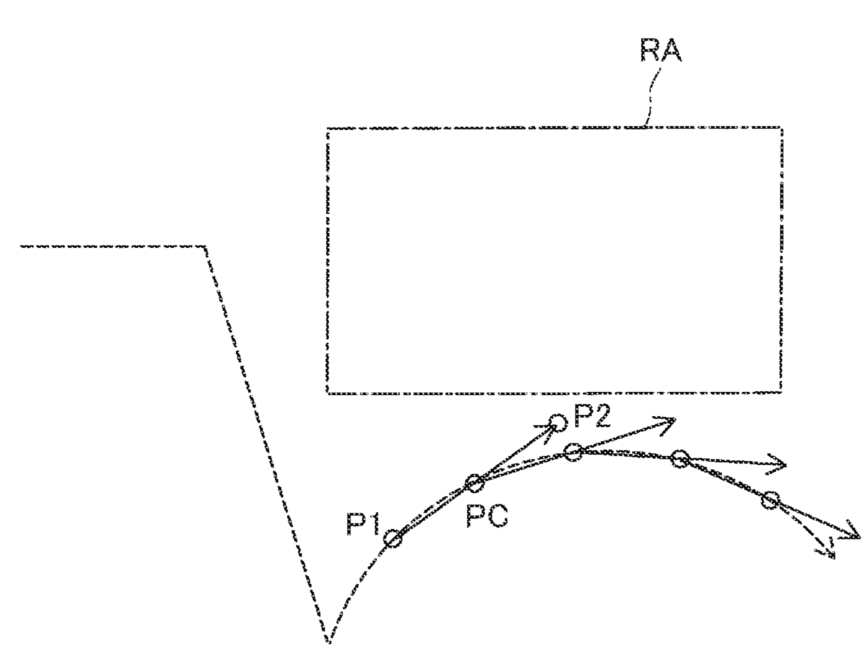
FIG. 8 is a diagram of a method for predicting a position.

FIG. 8 is a diagram of a method for predicting the position. In FIG. 8, the restriction region RA is set as a rectangular region. First, the control unit 730 calculates a position PC which is a current position of the control point of the robot 100 at the current time point by calculation based on forward kinematics using rotation angles detected by the six angle sensors 133 and lengths of the links constituting the arm 120. In addition, the control unit 730 calculates a position P1 of the control point at a time point T1 before a time point TC which is the current time point. For example, the time point TC is a time point 100 milliseconds after the time point T1. In the example shown in FIG. 8, the position P1 is calculated on an assumption that the positions P1 and PC are on the same straight line. The position P1 is also referred to as a first position. The time point T1 is also referred to as a first time point. Further, the control unit 730 obtains a moving speed V1 of the control point. Specifically, the control unit 730 obtains the moving speed V1 by dividing a distance between the position P1 and the position PC by a time difference between the time point T1 and the time point TC.

The control unit 730 calculates, using information indicating the position P1, information indicating the position PC, an elapsed time from the time point T1 to the time point TC, and the moving speed V1, a position P2 of the control point of the robot 100 at a time point T2 after the time point TC. The time point T2 is a time point when the time difference between the time point TC and the time point T1 elapses since the time point TC. The position P2 is also referred to as a second position. The time point T2 is also referred to as a second time point. The control unit 730 calculates a distance between the position PC and the position P2 by multiplying the moving speed V1 by a time difference between the time point TC and the time point T2. In the example shown in FIG. 8, the position P2 is calculated on an assumption that the positions P1, PC, and P2 are on the same straight line.

As shown in FIG. 7, in step S106, the control unit 730 determines whether there is a possibility that the robot 100 enters the restriction region RA according to whether the predicted position P2 is included in the restriction region RA. When the control unit 730 determines that the robot 100 is likely to enter the restriction region RA (step S106; YES), the control unit 730 executes the processing of step S107. On the other hand, when it is determined that there is no possibility that the robot 100 enters the restriction region RA (step S106; NO), the control unit 730 executes the processing of step S113.

As shown in FIG. 7, in step S107, the processing same as in step S107 shown in FIG. 5 is performed. Therefore, when the operation of the robot 100 is resumed after the temporary stop in step S107, the return operation is unnecessary.

In steps S109, 111, and 113 shown in FIG. 7, the processing same as steps S109, 111, and 113 shown in FIG. 5 are performed, respectively.

In the embodiment, when the robot 100 operates while searching for a path, the control unit 730 predicts at least one position to which the robot 100 moves after the current time point, and predicts whether there is a possibility that the robot 100 enters the restriction region RA.

Also in the embodiment, as in the first embodiment, when there is a possibility that the robot arm enters the restriction region RA, the control unit 730 performs control to avoid the robot arm from entering the restriction region RA. Therefore, the operation of the robot 100 is not forcibly stopped by the functional safety unit 750. In this case, the return operation when resuming the operation after the forced stop is unnecessary. Accordingly, it is possible to shorten a time during which the work of the robot 100 is forcibly interrupted.

C. Another Embodiments

C1. Another Embodiment 1

In the second embodiment, an example is described in which a position moved from the position PC by the same distance as the distance from the position P1 to the position PC is set to the position P2. However, the method for predicting the position to which the control point moves is not limited thereto.

Figure 9:
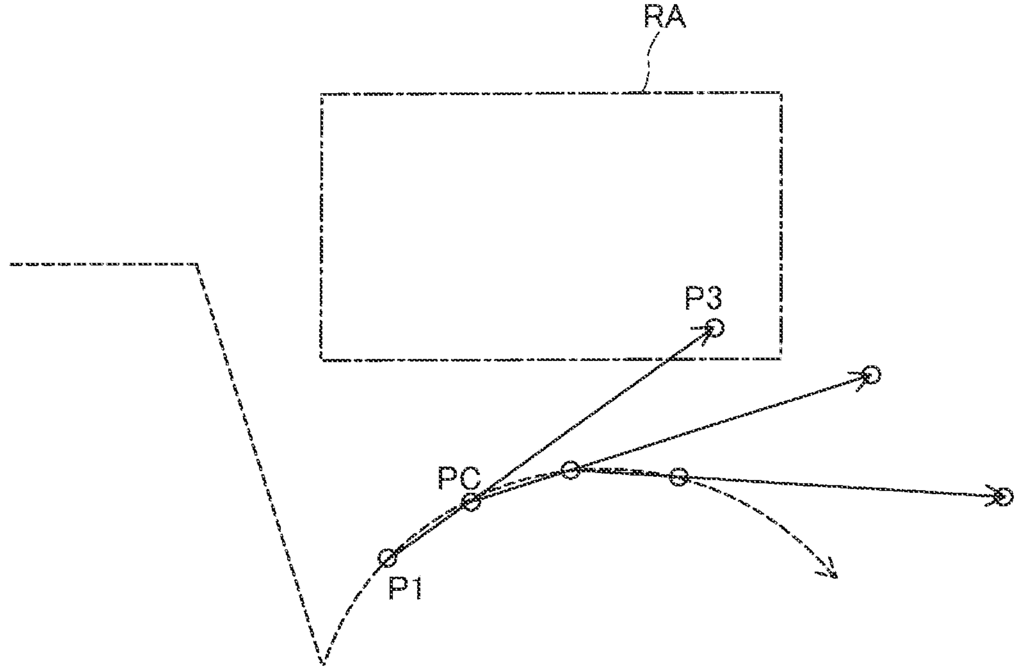
FIG. 9 is a diagram of another method for predicting the position.

FIG. 9 is a diagram of another method for predicting the position. In FIG. 9, the restriction region RA is set as a rectangular region. First, as in the second embodiment, the control unit 730 calculates the position PC at a current time point, the position P1 of the control point at the time point T1 before the time point TC that is the current time point, and the moving speed V1 of the control point.

The control unit 730 calculates, using the information indicating the position P1, the information indicating the position PC, the elapsed time from the time point T1 to the time point TC, and the moving speed V1, a position P3 of the control point of the robot 100 at a time point T3 after the time point TC. The position P3 is also referred to as the second position. The time point T3 is also referred to as the second time point. For example, the time point TC is a time point 100 milliseconds after the time point T1. The time point T3 is a time point when a time obtained by multiplying the time difference between the time point TC and the time point T1 by a constant elapses from the time point TC. For example, the constant is set to 3. The control unit 730 calculates a distance between the position PC and the position P3 by multiplying the moving speed V1 by a time difference between the time point TC and the time point T3. In the example shown in FIG. 9, the position P3 is calculated on an assumption that the positions P1, PC, and P3 are on the same straight line.

The control unit 730 determines whether there is a possibility that the robot 100 enters the restriction region RA according to whether the predicted position P3 is included in the restriction region RA. When the control unit 730 determines that there is a possibility that the robot 100 enters the restriction region RA, the control unit 730 controls the driving unit 710 to temporarily stop the robot 100.

Alternatively, the control unit 730 determines whether the time from the time point TC, which is the current time point, to the time point T3 is equal to or greater than a predetermined threshold value. When the time from the time point TC, which is the current time point, to the time point T3 is equal to or greater than the predetermined threshold value, the control unit 730 may decelerate the moving speed of the control point of the robot 100 before temporarily stopping the operation of the robot 100. For example, the control unit 730 decelerates the moving speed of the control point of the robot 100 to half the current speed.

Therefore, a time for the robot 100 to approach the restriction region RA can be delayed by decelerating the moving speed of the control point of the robot 100 before the robot 100 is temporarily stopped. For example, when the restriction region RA is disabled after the robot 100 decelerates after the control point moves from the position PC, the robot 100 does not need to be temporarily stopped. As shown in FIG. 9, after the robot 100 decelerates and the control point moves from the position PC, the predicted position of the control point may deviate from the restriction region RA. In this case, it is also not necessary to temporarily stop the robot 100. The control to decelerate the moving speed of the robot 100 is an example of the control to avoid the entry of the robot arm into the entry restriction region.

C2. Another Embodiment 2

In addition, the control unit 730 may avoid the robot 100 from entering the restriction region RA as follows by combining the configuration according to the second embodiment and the configuration according to the another Embodiment 1.

FIG. 10 is a flowchart of processing related to position control in another Embodiment 2. The processing shown in FIG. 10 is executed by the CPU 732 of the control unit 730. For example, when a user gives an instruction to start the processing via an input device (not shown), the control unit 730 starts the processing shown in FIG. 10. In FIG. 10, the processing same as the processing related to the position control in the first embodiment (see FIG. 5) is denoted by the same reference numeral. In parallel with the execution of the processing shown in FIG. 10, the control unit 730 controls the operation of the robot 100 so that the control point of the robot 100 moves along the dynamically generated path.

In step S101, the processing same as in step S101 shown in FIG. 5 is performed. When the restriction region RA is enabled (step S101; YES), the control unit 730 executes processing of step S201. When the restriction region RA is disabled (step S101; NO), the control unit 730 executes the processing of step S113.

In step S201 shown in FIG. 10, the control unit 730 predicts the position P3 to which the control point moves after a current time point by the method same as in the another Embodiment 1 (see FIG. 9).

In step S202 shown in FIG. 10, the control unit 730 determines whether the predicted position P3 is included in the restriction region RA. When the predicted position P3 is included in the restriction region RA (step S202; YES), the control unit 730 executes processing of step S203. On the other hand, when the predicted position P3 is not included in the restriction region RA (step S202; NO), the control unit 730 executes the processing of step S113.

In step S203, the control unit 730 predicts the position P2 to which the control point moves after the current time point by the method same as in the second embodiment (see FIG. 8).

In step S204 shown in FIG. 10, the control unit 730 determines whether the predicted position P2 is included in the restriction region RA. When the predicted position P2 is included in the restriction region RA (step S204; YES), the control unit 730 executes the processing of step S107. In step S107, the control unit 730 controls the driving unit 710 to temporarily stop the robot 100. Thereafter, in steps S109, 111, and 113, the processing same as steps S109, 111, and 113 shown in FIG. 5 are performed, respectively.

when the position P2 predicted in step S204 shown in FIG. 10 is not included in the restriction region RA (step S204; NO), the control unit 730 executes processing of step S205.

In step S205, the control unit 730 decelerates the moving speed of the control point by controlling the driving unit 710. For example, the control unit 730 decelerates the moving speed of the control point to half the current speed.

In the another Embodiment 2, the control unit 730 first determines whether the position P3 is included in the restriction region RA. When the position P3 is included in the restriction region RA, the control unit 730 further determines whether the position P2 is included in the restriction region RA. As shown in FIGS. 8 and 9, the distance from the position PC to the position P3 at the current time point is three times the distance from the position PC to the position P2 at the current time point. When the position P3 is included in the restriction region RA but the position P2 is not included in the restriction region RA, it is considered that a time taken for the control point to enter the restriction region RA is longer than when the position P3 is included in the restriction region RA and the position P2 is included in the restriction region RA. Therefore, when the position P3 is included in the restriction region RA but the position P2 is not included in the restriction region RA, the moving speed of the control point is temporarily reduced. Therefore, the time for the robot 100 to approach the restriction region RA can be delayed without stopping the robot 100.

C3. Another Embodiment 3

In the second embodiment and the another Embodiment 1, an example is described in which the position of the control point at a time point after the current time point is calculated using the current position, the position P1 at the time point T1 before the current time point, and the moving speed. Alternatively, the control unit 730 can generate an N-th-order spline curve using information on (N+1) positions representing the current position and N positions through which the control point passes before the current time point, and can predict the position of the control point after the current time point based on the generated spline curve. Alternatively, the control unit 730 can generate a Bezier curve or a B-spline curve using information indicating the current position and a plurality of positions through which the control point passes before the current time point, and can predict the position of the control point after the current time point based on the generated Bezier curve or the B-spline curve.

C4. Another Embodiment 4

When there is a possibility that the robot 100 enters the restriction region RA, the control unit 730 may notify a worker that the robot 100 is temporarily stopped in order to avoid the robot 100 from entering the restriction region RA, in addition to executing the temporary stop of the robot 100. For example, a notification device (not shown) is provided in a production facility or the robot controller 700. The notification device is, for example, a display or a speaker. The notification device is a device that notifies the worker of information. The control unit 730 controls the notification device to notify the worker of the information. The control unit 730 notifies the worker that there is a possibility that the robot 100 enters the restriction region RA using the notification device. Accordingly, the worker can recognize that the restriction region RA is enabled and there is a possibility that the robot 100 enters the restriction region RA. Therefore, it is possible to prevent the worker around the restriction region RA from inadvertently entering the restriction region. In addition, when the worker is performing a work within the restriction region RA, the worker can quickly finish the work and leave the restriction region RA. The control of the notification device for notifying the worker of the information is an example of the control to avoid the entry of the robot arm into the entry restriction region.

C5. Another Embodiment 5

In the first embodiment and the second embodiment, an example is described in which whether there is a possibility that the robot 100 enters the restriction region RA is determined according to whether the position of the control point of the robot 100 is within the restriction region RA.

Alternatively, the control unit 730 may determine that there is a possibility that the robot 100 enters the restriction region RA when at least a part of a circular region having a radius determined with a predicted position of the control point as a center is included in the restriction region RA.

Alternatively, the control unit 730 may determine that there is a possibility that the robot 100 enters the restriction region RA when at least a part of a circular region having a radius determined with a current position of the control point as a center is included in the restriction region RA.

C6. Another Embodiment 6

In the first embodiment, an example is described in which the region in which the worker performs the work is set as the restriction region RA. Alternatively, the restriction region RA may be set by combining a region in which the worker performs the work and a certain region around the region. Since a range wider than the region in which the worker performs the work is set as the restriction region RA, it is possible to reliably prevent the robot 100 from entering the region in which the worker performs the work.

C7. Another Embodiment 7

In the first embodiment, an example is described in which the control unit 730 resumes the operation of the robot 100 when it is determined that the restriction region RA is disabled after the control to avoid the entry of the robot arm into the restriction region RA is performed by temporarily stopping the operation of the robot 100.

Alternatively, when the control unit 730 determines that the restriction region RA is disabled after the operation of the robot 100 is temporarily stopped, the control unit 730 may notify the worker of the fact using a notification device (not shown). The control unit 730 may resume the operation of the robot 100 after receiving an instruction from the worker to resume the operation via an input device. In this case, although the time for which the work of the robot 100 is interrupted is longer than in the configuration according to the first embodiment, the worker can grasp that the work of the robot 100 is resumed. The worker may instruct that the operation of the robot 100 can be resumed after performing necessary check when resuming the operation of the robot 100.

C8. Another Embodiment 8

Alternatively, when the restriction region RA is enabled, the predicted position of the control point is within the restriction region RA, and there is a possibility that the robot 100 enters the restriction region RA, the functional safety unit 750 may execute a protection stop corresponding to "safe stop 2 (SS2)" defined in IEC 60204-1:2016.

C9. Another Embodiment 9

In the first embodiment and the second embodiment, an example is described in which the safety input signal SS is input from the safety input unit 300 to the control unit 730 and the functional safety unit 750. However, the safety input signal SS may not be input to the control unit 730 from the safety input unit 300. In this case, the functional safety unit 750 may notify the control unit 730 that the restriction region RA is enabled while the safety input signal SS is received from the safety input unit 300. Therefore, the control unit 730 can recognize whether the entry restriction region is enabled or disabled.

C10. Another Embodiment 10

In the above-described embodiments, the safety input unit 300 continues to output the safety input signal SS while a person is present in the restriction region RA. However, when a person enters the restriction region RA, the safety input unit 300 may input the safety input signal SS to the robot controller 700 for a determined time. The safety input unit 300 may output a release signal to the robot controller 700 when the person is no longer present in the restriction region RA.

Although an example in which one control point is set is described in the embodiments, two or more control points may be set. For example, the TCP and the joint J3 corresponding to a human elbow joint may be set as the control points.

In the first embodiment, although an example in which the functional safety unit 750 is implemented to satisfy the standard related to functional safety is described, the functional safety unit 750 may not be implemented to satisfy the standard related to the functional safety.

Although an example of a six-axis vertically articulated robot is described in the embodiments, the robot 100 may be any robot including an arm. The robot 100 may be, for example, a SCARA robot.

The present disclosure is not limited to the embodiments described above, and can be implemented in various aspects without departing from the gist of the present disclosure. For example, technical features of the embodiments described above corresponding to technical features in the embodiments described in the summary can be replaced or combined as appropriate in order to solve a part or all of problems, or in order to achieve a part or all of effects described above. The technical features can be deleted as appropriate unless described as being essential in the specification.

D. Other Aspects (1) A first aspect of the present disclosure provides a control method for controlling a robot arm in a robot system. The robot system includes the robot arm, a control unit configured to control an operation of the robot arm, and a functional safety unit configured to execute, when an entry restriction region is enabled and the robot arm enters the entry restriction region, a forced stop which is a forced stop of the operation of the robot arm and which requires a return operation when resuming the operation after the stop, and not to execute, when the entry restriction region is disabled and the robot arm enters the entry restriction region, the forced stop of the operation of the robot arm. The control method for controlling the robot arm by the control unit includes: detecting a current position of a control point of the robot arm; predicting, using at least position information indicating the current position, at least one position to which the control point of the robot arm moves after a current time point; and performing, when the entry restriction region is enabled and there is a possibility that the robot arm enters the entry restriction region based on the at least one predicted position, control to avoid entry of the robot arm into the entry restriction region, the control including execution of a temporary stop which is a temporary stop of the operation of the robot arm before the robot arm enters the entry restriction region and which does not require the return operation when resuming the operation after the stop.

According to the above aspect, possibility that the robot arm enters the entry restriction region is predicted, and when there is a possibility that the robot arm enters the entry restriction region, the control is performed to avoid the robot arm from entering the entry restriction region. Therefore, the functional safety unit does not need to forcibly stop the operation of the robot arm, so that the return operation when resuming the operation after the forced stop is not necessary. Accordingly, it is possible to shorten a time during which the work of the robot arm is forcibly interrupted.

(2) The above aspect may further include receiving, from a safety input device, a safety input signal switching between enabling and disabling the entry restriction region.

According to the above aspect, the control unit can easily grasp whether the entry restriction region is enabled or disabled based on the input signal from the safety input device.

(3) The above aspect may further include resuming the operation of the robot arm when it is detected that the entry restriction region is disabled based on the safety input signal while the operation of the robot arm is temporarily stopped due to execution of performing the control to avoid the entry.

According to the above aspect, when the entry restriction region is disabled after performing the control to avoid the entry of the robot arm into the entry restriction region, the control including the temporary stop of the operation of the robot arm, the operation of the robot arm can be quickly resumed. It is possible to shorten the time during which the work of the robot arm is interrupted as compared with a mode in which the control unit does not avoid the entry of the robot arm into the entry restriction region.

(4) In the above aspect, while predicting the position, path information indicating a scheduled movement path for a movement of the control point of the robot arm may be read from a storage unit, and a path including the at least one position to which the robot arm moves after the current time point may be predicted using the position information and the path information, and while performing the control to avoid the entry, in a case in which the entry restriction region is enabled and there is a possibility that the robot arm enters the entry restriction region, the control is performed to avoid the entry of the robot arm into the entry restriction region when at least a part of the predicted path is included in the entry restriction region.

According to the above aspect, it is possible to reliably predict whether there is a possibility that the robot arm enters the entry restriction region by using the path information indicating the scheduled movement path.

(5) In the above aspect, while predicting the position, at least a first position of the robot arm at a first time point before the current time point may be obtained, and a second position of the control point of the robot arm at a second time point after the current time point may be predicted as the at least one position using information indicating the first position, the position information, and an elapsed time from the first time point to the current time point, and while performing the control to avoid the entry, in a case in which the entry restriction region is enabled and there is a possibility that the robot arm enters the entry restriction region, the control is performed to avoid the entry of the robot arm into the entry restriction region when the predicted second position is included in the entry restriction region.

According to the above aspect, it is possible to predict whether there is a possibility that the robot arm enters the entry restriction region even when the robot arm operates while for a path, instead of operating along the scheduled movement path.

(6) In the above aspect, while performing the control to avoid the entry, when the entry restriction region is enabled and the second position is included in the entry restriction region, when a time from the current time point to the second time point is equal to or greater than a predetermined threshold value, a moving speed of the control point of the robot arm may be decelerated before execution of the temporary stop.

According to the above aspect, it is possible to delay a time for the robot arm to approach the entry restriction region by decelerating the moving speed of the robot arm before the temporary stop.

(7) In the above aspect, while performing the control to avoid the entry, when the entry restriction region is enabled and there is a possibility that the robot arm enters the entry restriction region based on the at least one predicted position, the control further including executing a notification that there is a possibility that the robot arm enters the entry restriction region may be performed.

According to the above aspect, since the robot arm is notified of the entry into the entry restriction region, it is possible to prevent a worker from inadvertently entering the entry restriction region.

(8) In the above aspect, the functional safety unit may be configured to satisfy a standard related to functional safety.

(9) According to a second aspect of the present disclosure, a robot system is provided. The robot system includes: a robot arm; a control unit configured to control an operation of the robot arm; and a functional safety unit configured to execute, when an entry restriction region is enabled and the robot arm enters the entry restriction region, a forced stop which is a forced stop of the operation of the robot arm and which requires a return operation when resuming the operation after the stop, and not to execute, when the entry restriction region is disabled and the robot arm enters the entry restriction region, the forced stop of the operation of the robot arm. The control unit is configured to detect a current position of a control point of the robot arm, predict, using at least information indicating the current position, at least one position to which the control point of the robot arm moves after a current time point, and perform, when the entry restriction region is enabled and there is a possibility that the robot arm enters the entry restriction region based on the at least one predicted position, control to avoid entry of the robot arm into the entry restriction region, the control including execution of a temporary stop which is a temporary stop of the operation of the robot arm before the robot arm enters the entry restriction region and which does not require the return operation when resuming the operation after the stop.

According to the above aspect, possibility that the robot arm enters the entry restriction region is predicted, and when there is a possibility that the robot arm enters the entry restriction region, the control is performed to avoid the robot arm from entering the entry restriction region. Therefore, the functional safety unit does not need to forcibly stop the operation of the robot arm, so that the return operation when resuming the operation after the forced stop is not necessary. Accordingly, it is possible to shorten a time during which the work of the robot arm is forcibly interrupted.

(10) According to a third aspect of the present disclosure, a non-transitory computer-readable storage medium storing a program is provided. The program is executed by a computer that controls a robot arm in a robot system. The robot system includes the robot arm, a control unit configured to control an operation of the robot arm, and a functional safety unit configured to execute, when an entry restriction region is enabled and the robot arm enters the entry restriction region, a forced stop which is a forced stop of the operation of the robot arm and which requires a return operation when resuming the operation after the stop, and not to execute, when the entry restriction region is disabled and the robot arm enters the entry restriction region, the forced stop of the operation of the robot arm. The program causes the computer to implement: a function of detecting a current position of a control point of the robot arm; a function of predicting, using at least information indicating the current position, at least one position to which the control point of the robot arm moves after a current time point; and a function of performing, when the entry restriction region is enabled and there is a possibility that the robot arm enters the entry restriction region based on the at least one predicted position, control to avoid entry of the robot arm into the entry restriction region, the control including execution of a temporary stop which is a temporary stop of the operation of the robot arm before the robot arm enters the entry restriction region and which does not require the return operation when resuming the operation after the stop.

According to the above aspect, possibility that the robot arm enters the entry restriction region is predicted, and when there is a possibility that the robot arm enters the entry restriction region, the control is performed to avoid the robot arm from entering the entry restriction region. Therefore, the functional safety unit does not need to forcibly stop the operation of the robot arm, so that the return operation when resuming the operation after the forced stop is not necessary. Accordingly, it is possible to shorten a time during which the work of the robot arm is forcibly interrupted.

What is claimed is:

1. A control method for controlling a robot arm in a robot system, the robot system including:

the robot arm configured to move in an entry restriction region;

a safety device including a sensor or a switch configured to detect whether an operator enters into the entry restriction region;

at least one memory configured to store at least one program; and at least one processor configured to execute the at least one program so as to:

control an operation of the robot arm;

execute, when the entry restriction region is enabled by the at least one processor and the robot arm enters the entry restriction region, a forced stop which forcibly stops the operation of the robot arm and which requires a return operation when resuming the operation after the forced stop; and not to execute, when the entry restriction region is disabled and the robot arm enters the entry restriction region, the forced stop of the operation of the robot arm, wherein the entry restriction region is defined in advance before the operation of the robot arm, the control method for causing the at least one processor to execute a process, the control method comprising executing on the at least one processor the steps of:

detecting a current position of a control point of the robot arm;

predicting, using at least position information indicating the current position, at least one position to which the control point of the robot arm moves after a current time point; and performing, when the entry restriction region is enabled and there is a possibility that the robot arm enters the entry restriction region based on the at least one predicted position, control to avoid entry of the robot arm into the entry restriction region, the control including execution of a temporary stop which temporarily stops the operation of the robot arm before the robot arm enters the entry restriction region and which does not require the return operation when resuming the operation after the temporary stop, wherein, in the predicting of the at least one position, at least a first position of the robot arm at a first time point before the current time point is obtained, and a second position of the control point of the robot arm at a second time point after the current time point is predicted as the at least one position using information indicating the first position, the position information, and an elapsed time from the first time point to the current time point, and in the performing of the control to avoid the entry, when:

the entry restriction region is enabled;

the second position is included in the entry restriction region; and a time from the current time point to the second time point is equal to or greater than a predetermined threshold value, a moving speed of the control point of the robot arm is decelerated before execution of the temporary stop.

2. The control method according to claim 1, further comprising:

receiving, from a safety input device, a safety input signal switching between enabling and disabling the entry restriction region.

3. The control method according to claim 2, further comprising:

resuming the operation of the robot arm when it is detected that the entry restriction region is disabled based on the safety input signal while the operation of the robot arm is temporarily stopped due to execution of performing the control to avoid the entry.

4. The control method according to claim 1, wherein in the predicting of the at least one position, path information indicating a scheduled movement path for a movement of the control point of the robot arm is read from the at least one memory, and a path including the at least one position to which the robot arm moves after the current time point is predicted using the position information and the path information, such that the second position is predicted.

5. The control method according to claim 1, wherein in the performing of the control to avoid the entry, when the entry restriction region is enabled and there is a possibility that the robot arm enters the entry restriction region based on the at least one predicted position, the control further including executing a notification that there is a possibility that the robot arm enters the entry restriction region is performed.

6. The control method according to claim 1, wherein the at least one processor is further configured to satisfy a standard related to functional safety.

7. A robot system comprising:

a robot arm configured to move in an entry restriction region;

a safety device including a sensor or a switch configured to detect whether an operator enters into the entry restriction region;

at least one memory configured to store at least one program; and at least one processor configured to execute the at least one program so as to:

control an operation of the robot arm;

execute, when the entry restriction region is enabled by the at least one processor and the robot arm enters the entry restriction region, a forced stop which forcibly stops the operation of the robot arm and which requires a return operation when resuming the operation after the forced stop;

not to execute, when the entry restriction region is disabled and the robot arm enters the entry restriction region, the forced stop of the operation of the robot arm, wherein the entry restriction region is defined in advance before the operation of the robot arm;

detect a current position of a control point of the robot arm, predict, using at least information indicating the current position, at least one position to which the control point of the robot arm moves after a current time point, and perform, when the entry restriction region is enabled and there is a possibility that the robot arm enters the entry restriction region based on the at least one predicted position, control to avoid entry of the robot arm into the entry restriction region, the control including execution of a temporary stop which temporarily stops the operation of the robot arm before the robot arm enters the entry restriction region and which does not require the return operation when resuming the operation after the temporary stop, wherein, when the at least one processor predicts the at least one position, the at least one processor is further configured to:

obtain at least a first position of the robot arm at a first time point before the current time point; and predict a second position of the control point of the robot arm at a second time point after the current time point as the at least one position using information indicating the first position, the position information, and an elapsed time from the first time point to the current time point, and during performing, by the at least one processor, the control to avoid entry of the robot arm into the entry restriction region, when:

the entry restriction region is enabled;

the second position is included in the entry restriction region; and a time from the current time point to the second time point is equal to or greater than a predetermined threshold value, a moving speed of the control point of the robot arm is decelerated before execution of the temporary stop.

8. A non-transitory computer-readable storage medium storing a program, the program causing at least one processor to execute the program to perform the steps of:

controlling an operation of a robot arm;

executing, when an entry restriction region is enabled by the at least one processor and the robot arm enters the entry restriction region, a forced stop which forcibly stops the operation of the robot arm and which requires a return operation when resuming the operation after the forced stop;

not executing, when the entry restriction region is disabled and the robot arm enters the entry restriction region, the forced stop of the operation of the robot arm, wherein the entry restriction region is defined in advance before the operation of the robot arm;

detecting a current position of a control point of the robot arm;

predicting, using at least information indicating the current position, at least one position to which the control point of the robot arm moves after a current time point; and performing, when the entry restriction region is enabled and there is a possibility that the robot arm enters the entry restriction region based on the at least one predicted position, control to avoid entry of the robot arm into the entry restriction region, the control including execution of a temporary stop which temporarily stops the operation of the robot arm before the robot arm enters the entry restriction region and which does not require the return operation when resuming the operation after the temporary stop, wherein, when the at least one processor predicts the at least one position, the at least one processor is further configured to:

obtain at least a first position of the robot arm at a first time point before the current time point; and predict a second position of the control point of the robot arm at a second time point after the current time point as the at least one position using information indicating the first position, the position information, and an elapsed time from the first time point to the current time point, and during performing, by the at least one processor, the control to avoid entry of the robot arm into the entry restriction region, when:

the entry restriction region is enabled;

the second position is included in the entry restriction region; and a time from the current time point to the second time point is equal to or greater than a predetermined threshold value, a moving speed of the control point of the robot arm is decelerated before execution of the temporary stop.

* * * * *